United States Patent [19]

Shibahata et al.

[11] Patent Number: 4,519,627
[45] Date of Patent: May 28, 1985

[54] AUTOMATIVE COMPLIANCE STEERING CONTROL SUPENSION

[75] Inventors: Yasuji Shibahata; Namio Irie, both of Yokohama; Kazuo Ikawa, Tokorozawa; Yohsuke Akatsu, Yokohama, all of Japan

[73] Assignee: Nissan Motor Co., Ltd., Yokohama, Japan

[21] Appl. No.: 501,077

[22] Filed: Jun. 6, 1983

[30] Foreign Application Priority Data

Jun. 7, 1982 [JP] Japan ................................ 57-97367

[51] Int. Cl.³ .......................... B60G 21/00; B62D 9/00
[52] U.S. Cl. .................................. 280/701; 280/112 A
[58] Field of Search ........................... 280/112 A, 701;
180/70.1, 135, 140, 701

[56] References Cited

U.S. PATENT DOCUMENTS 4,245,853  1/1981  Inove et al. ...................... 280/701

Primary Examiner—Richard A. Bertsch
Attorney, Agent, or Firm—Schwartz, Jeffery, Schwaab, Mack, Blumenthal & Koch

[57] ABSTRACT

To control the compliance steering of the rear wheels of a vehicle during cornering or the like, a link member of the rear suspension arrangements supporting each of the rear road wheels, is provided with a servo mechansim which can vary the length thereof in a manner which tends to steer the rear wheel associated therewith in the same direction as the front wheels are turned to produce the cornering.

12 Claims, 15 Drawing Figures

AUTOMATIVE COMPLIANCE STEERING CONTROL SUPENSION

BACKGROUND OF THE INVENTION

1. Field of the Invention

The present invention relates generally to an automotive suspension and more specifically to a suspension in which one of the links or members of each of the arrangements which supports a road wheel is variable in length to enable steering of the wheel associated therewith.

2. Background of the Invention

In a previously proposed arrangement such as shown in FIG. 1 of the drawings, the rear wheels 1 of a vehicle are supported on a live or rigid axle 2 via knuckle rods 3 which are interconnected by a tie rod 4. A servo cylinder 5 operated by either compressed air or hydraulic fluid is connected to one of the knuckle rods 3 in a manner to turn the wheels 1 and steer same in response to the lateral acceleration of the vehicle and compensate for the inevitable compliance steer phenomenon permitted by the elastomeric nature of the bushes and elements included in the suspension to damp vibration.

However, this arrangement has suffered from the drawbacks that each of the rear wheels must be pivotally mounted on a king pin or the like in a manner similar to the front wheels, which markedly increases the cost and weight of the vehicle and further imposes notable design limitations on the rear suspension.

A detailed description of the above described arrangement can be found in Japanese Utility Model Patent Application Pre Publication No. Sho 55-147968.

SUMMARY OF THE INVENTION

It is an object of the present invention to provide a compliance steer control arrangement for the suspension of an automotive vehicle which is robust and readily included in a number of known and well used suspension designs with the minimum of structural redesign and cost.

In brief the present invention features an arrangement which controls the complicance steering during cornering or the like, by increasing or decreasing the length of a link forming part of each of the suspension arrangements which supports a road wheel via a suitable hydraulic or pneumatic servo which is incorporated in said link.

More specifically, the present invention takes the form of a suspension for an automotive vehicle having a chassis and a road wheel, and which includes a first link operatively interconnecting the road wheel and the chassis, the first link extending from a location forward of the axis of rotation of the road wheel in a direction essentially toward the axis, a second link operatively connecting the road wheel to the chassis, the second link extending from a location inboard of the road wheel toward the road wheel, and a control arrangement associated with the second link for varying the length thereof in response to a sensed parameter.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
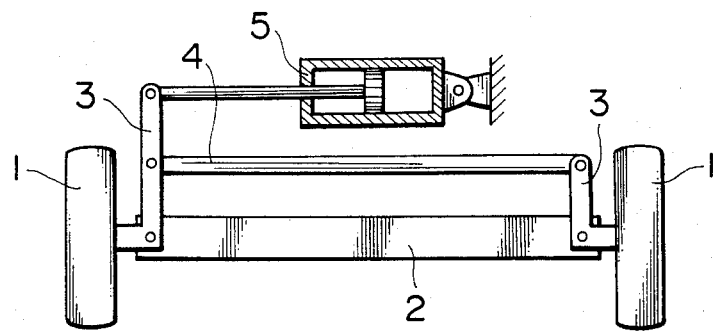
FIG. 1 is a schematic plan view of the arrangement briefly discussed in the opening paragraphs of the present specification.
Figure 2:
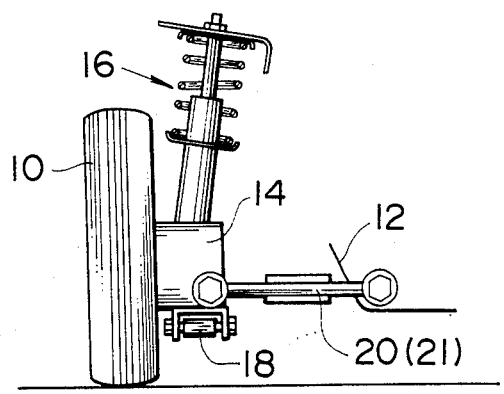
FIG. 2 is an elevational view showing a first embodiment of the present invention.
Figure 3:
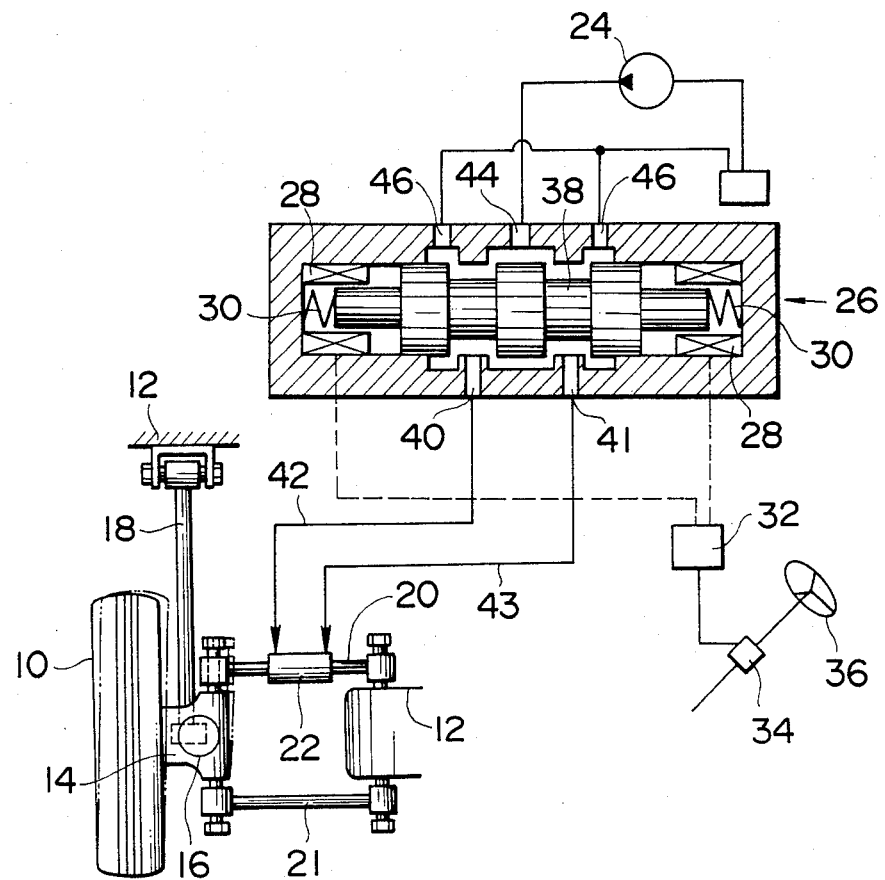
FIG. 3 is a plan view of the arrangement shown in FIG. 2.

Turning now to FIGS. 2 and 3, a first embodiment of the present invention is shown. In this arrangement a rear road wheel 10 is connected to the vehicle chassis 12 through a suspension arrangement including a wheel support member 14, a shock absorber/spring strut arrangement 16, a radius rod or first link 18 and two lateral rods 20, 21 comprising a second link. As shown, the radius rod 18 or first link is connected at the forward end thereof to the vehicle chassis 12 through an elastomeric bush (not shown) at a level forward of the road wheel and arranged to extend back toward the road wheel 10. The trailing end of the radius rod or first link 18 is pivotally connected to the lower side of the wheel support member 14 (see FIG. 2) through an elastomeric member (not shown). In this arrangement the radius rod 18 is arranged to move in a plane essentially parallel with a longitudinal axis of and normal to the vehicle chassis.

The forward of the two lateral rods (i.e., the second link) is provided with a servo device 22 which, as shown, is fluidly connected to a source of fluid under pressure 24 through a control valve 26. In this arrangement the valve 26 takes the form of an electromagnetic spool valve provided with solenoids 28 and return springs 30 at either end thereof. The solenoids 28 are operatively connected with a control circuit 32 which receives the output of a steering sensor 34 operatively connected with the steering wheel 36 of the vehicle.

With this arrangement, upon rotation of the steering wheel 36 the solenoids 28 are suitably energized in a manner to move the spool 38 and deliver hydraulic (or pneumatic) fluid under pressure through the discharge ports 40, 41 into conduits 42, 43 leading to the servo device 22. The signal produced by the control circuit and by which the solenoids 28 are energized may advantageously take the form of a pulse train, the duty cycle of which is variable in response the output of the sensor 34. Accordingly, upon energization, the solenoids 28 will induce the spool 38 to reciprocate back and forth in a manner to appropriately modulate the the communication between the line pressure inlet port 44, drain ports 46 and the discharge or outlet ports 40, 41.

Figure 4:
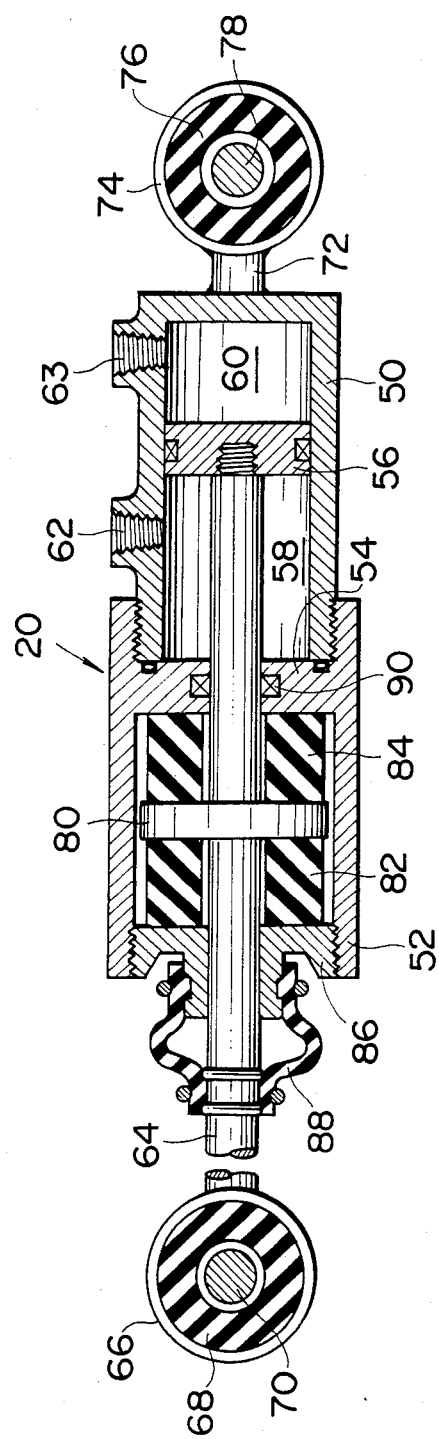
FIG. 4 is a sectional view of a strut or link member defining part of the first embodiment.

FIG. 4 shows in detail the construction of the above mentioned forward lateral rod 20. In this embodiment the rod includes two threadedly interconnected cylinders 50, 52. The open end of the cylinder 50 is closed by an end wall member 54 of the second cylinder 52 in a manner to define a hermetically sealed chamber. A first piston 56 is slidably disposed in the closed chamber to define two first and second variable volume chambers 58, 60 which communicate with the conduits 42, 43 through ports 62, 63. A rod or second section 64 is connected at one end to the first piston 56 and at the other end to an elastomeric bush retainer 66 in which a first elastomeric bush 68 mounted on a shaft 70 rigid with the wheel support member 14, is clamped. The end of the cylinder 50 is connected by a short rod or first section 72 with a second elastomeric bush retainer 74 in which a second elastomeric bush 76 mounted on a shaft 78 rigid with the chassis 12, is clamped. A piston-like member 80 (or second piston as it will be referred to hereinafter) which is fixedly connected to the rod 64 is sandwiched between first and second elastomeric members 82, 84 retained in the second cylinder 52 by a cap member 86 threaded into the open end thereof. These two first and second elastomeric members 82, 84 serve to return the first and second pistons 56, 80 to their respective neutral positions subsequent to the de-pressurization of one of the first and second variable volume chambers 58, 60 and to damp any tendency for the rod 64 and first and second pistons 56, 80 to resonate or otherwise unwantedly vibrate. A rubber boot 88 is connected to the cap member 86 and the rod 64 to prevent the entry of dirt and the like, into the cylinders 50, 52. To prevent any fluid escaping from first variable volume chamber 58 into the second cylinder 52 an oil seal 90 is provided as shown.

With the above arrangement, upon pressurization of one of the variable volume chambers, for example, chamber 60 in response to the rotation of the steering wheel 36 in the counterclockwise direction to steer the vehicle to the left, the first and second pistons 56, 80 and rod 64 will be driven in a direction to increase the length of the unit. This increase in length of course places a bias on the suspension arrangement which distorts the elastomeric bushings and members of the suspension arrangement in a manner that the rear road wheel 10 tends to be steered in the same direction as the front wheels (not shown). By controlling the level of pressure the amount of bias applied to the suspension by the servo device 22 can be controlled to the point of just compensating for the compliance steer effect produced by the vehicle traversing the curved path or actually exceed same to actually steer the rear wheels slightly.

Figure 5:
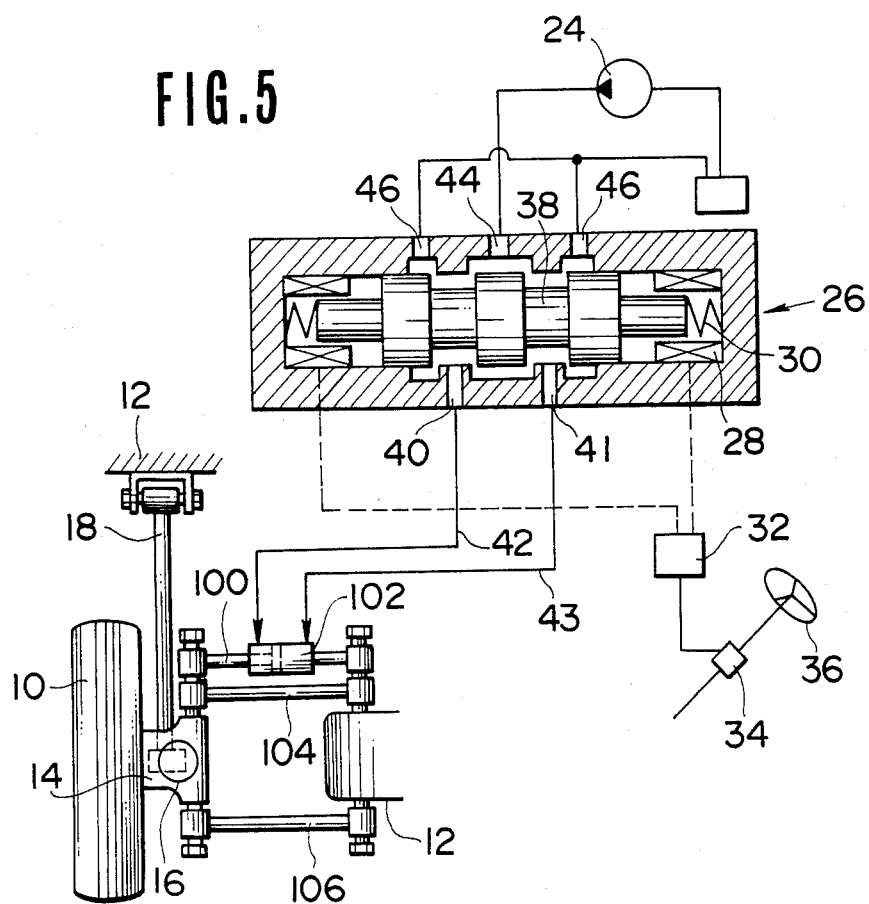
FIG. 5 is a schematic plan view of a second embodiment of the present invention.
Figure 6:
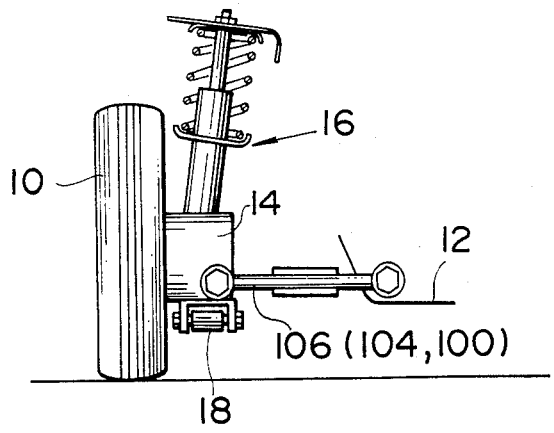
FIG. 6 is a elevational view of the arrangement shown in FIG. 5.
Figure 7:
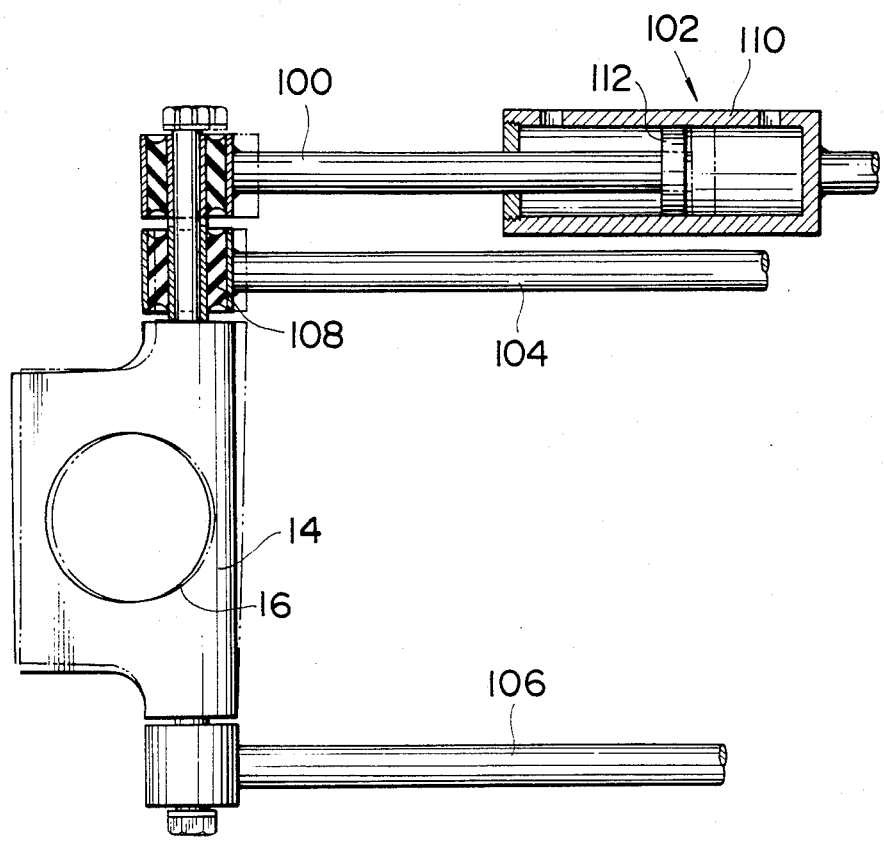
FIG. 7 is a plan view partially in section of part of the arrangement shown in FIGS. 5 and 6.

FIGS. 5 and 6 show a second embodiment of the present invention. This arrangement is essentially the same as the first but features the arrangement wherein the second link comprises a link 100 containing a servo mechanism or device 102 is provided in addition to the normal suspension links 104, 106. In this case the self centering action provided by the elastomeric members 82, 84 of the first embodiment is provided by the elastomeric bushes 108 at the ends of the suspension link or rod 104 whereby the simplified servo cylinder arrangement shown in FIG. 7 may be used. Viz., a servo in which only a single cylinder 110 and piston 112 arrangement is utilized.

Figure 8:
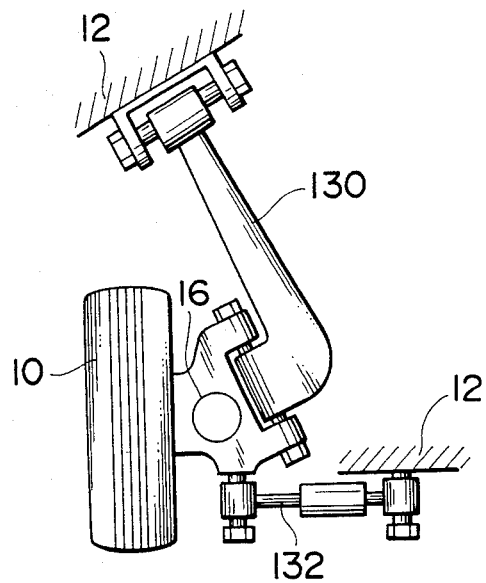
FIGS. 8 and 9 are respectively plan and elevation views of a third embodiment of the present invention.
Figure 9:
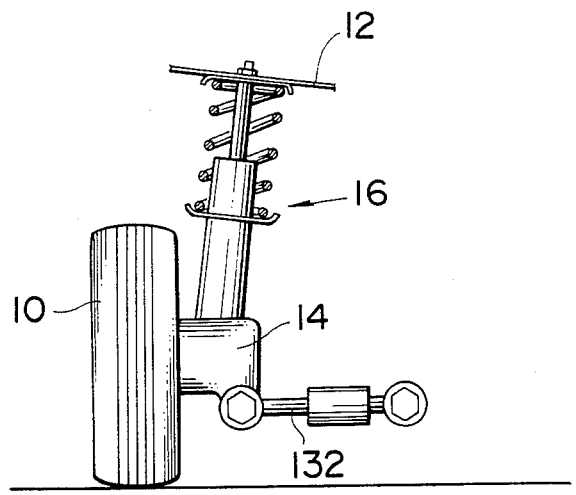

FIGS. 8 and 9 show a third embodiment of the present invention wherein the invention is applied to a trailing link type suspension in which the trailing first link or radius rod 130 extends at an angle with respect to the longitudinal axis of the chassis. The operation of this embodiment is similar to that of the first and second embodiments. That is to say, as the rod or second link member 132 is varied in length, the bushings included in the suspension will yield in a controlled manner to offset or counter the compliance steering effect normally encountered.

Figure 10:
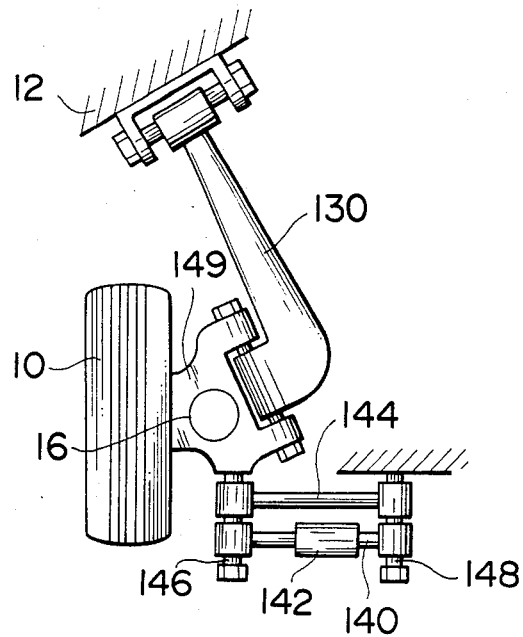
FIGS. 10 and 11 are respectively plan and elevational views of a fourth embodiment of the present invention.
Figure 11:
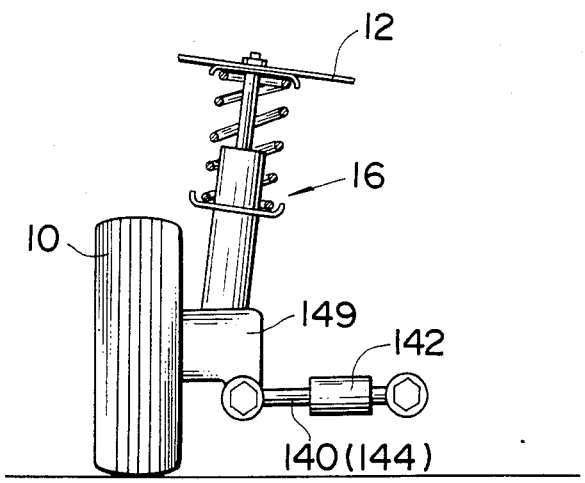

FIGS. 10 and 11 show a fourth embodiment of the present invention. This arrangement is essentially the same as the third embodiment with the exception that an additional second link 140 provided with a servo mechanism 142 is "added" to an existing trailing link type rear suspension already provided with a lateral rod or third link 144. This "modification" as will be readily appreciated may be achieved by simple providing shafts 146, 148 which are longer than normal on the wheel support member 149 and chassis 12 in a manner to facilitate the mounting of the additional link.

Figure 12:
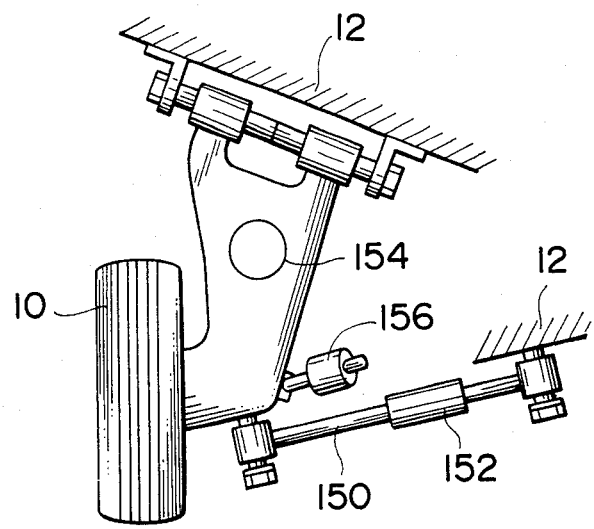
FIGS. 12 and 13 are respectively plan and elevation views showing a fifth embodiment of the present invention.
Figure 13:
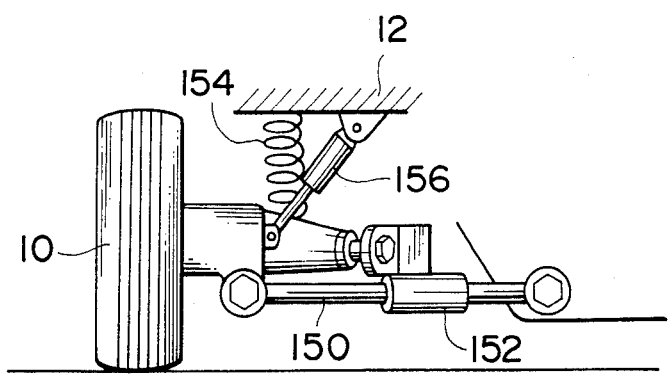

FIGS. 12 and 13 show a fifth embodiment of the present invention which features a trailing arm type suspension wherein the lateral rod or second link 150 is provided with a servo mechanism 152 of the nature disclosed in connection with FIG. 4. In this arrangement a coil spring 154 and a shock absorber 156 replace the single shock absorber/spring strut arrangement 16 of the previous embodiments.

Figure 14:
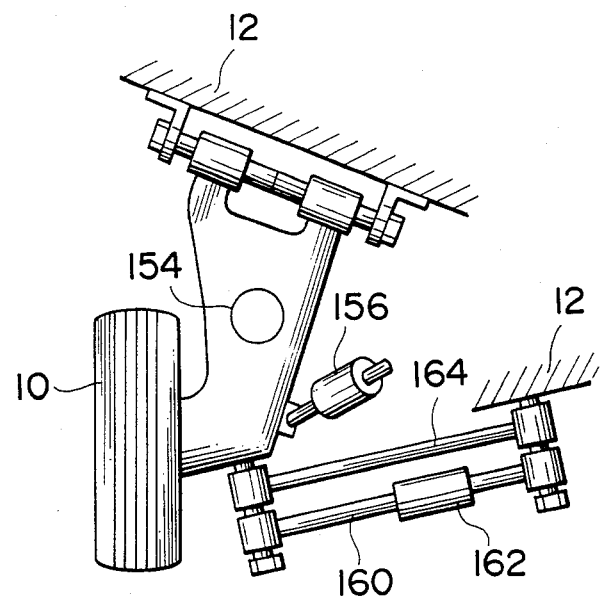
FIGS. 14 and 15 are plan and elevational views of a sixth embodiment of the present invention.
Figure 15:
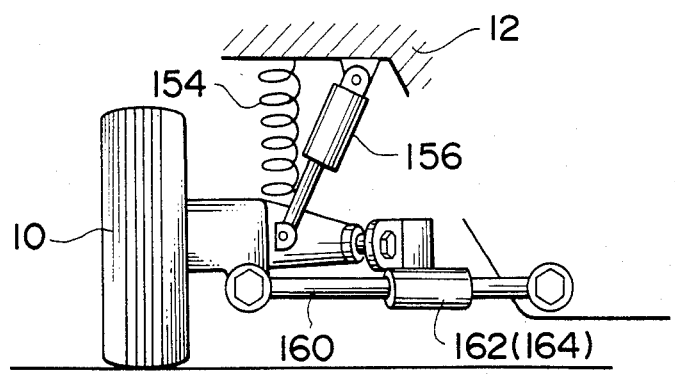

FIGS. 14 and 15 show a sixth embodiment of the present invention. This arrangement takes the form of a trailing arm type suspension modified by the addition of a second link or rod 160 in which a servo device 162 is incorporated. In this embodiment the link 160 may take the form of the arrangement shown in FIG. 7 due to the presence of third and fourth elastomeric bushes at either end of the lateral rod or third link 164 which will tend to center the arrangement upon depressurization of the servo chambers.

As will be appreciated from the foregoing disclosure, the present invention provides a unique method of incorporating a compliance steer control arrangement into known and well used suspension systems. The adaption of course may take the form of the replacement of one of the links of the suspension with one having a servo incorporated therein or the addition of such a link beside an existing one.

Further, although the present invention has been described in connection with rear suspension systems, it will be readily appreciated that the same concept may be applied to existing types of front suspension without departing from the scope of the invention.

What is claimed is:

1. In a suspension for a vehicle having a chassis and a road wheel, comprising:
    a first link operatively interconnecting said road wheel and said chassis, said first link extending from a location forward of the axis of rotation of said road wheel in a direction essentially toward said axis;
    a second link operatively connecting said road wheel to said chassis, said second link extending from a location inboard of said road wheel toward said road wheel; and
    a control arrangement associated with said second link for varying the length thereof in response to a sensed parameter.

2. A vehicle suspension as claimed in claim 1, wherein said control arrangement includes:
- a sensor for sensing the rotation of a steering wheel of said vehicle in first and second rotational directions; and
- a servo mechanism operatively connected with said second link and responsive to said sensor for elongating said second link in response to rotation of said steering wheel in said first rotational direction and shortening said second link in response to rotation of said steering wheel in said second rotational direction.

3. A vehicle suspension as claimed in claim 2, wherein said servo mechanism includes:
- a source of fluid under pressure;
- a valve responsive to the output of said sensor; and
- a device having first and second variable volume chambers, said first and second chambers being fluidly communicable with said source through said valve in a manner that the selective pressurization of said first chamber elongates said second link and selective pressurization of said second variable volume chamber shortens said second link.

4. A vehicle suspension as claimed in claim 3, wherein said second link is formed in first and second sections which are operatively connected by said device.

5. A vehicle suspension as claimed in claim 4, wherein said device takes the form of a cylinder in which a piston is reciprocatively disposed to define said first and second variable volume chambers, said cylinder being connected to said first section and said piston being connected to said second section of said second link.

6. A vehicle suspension as claimed in claim 5, wherein said device further comprises a second cylinder which is connected to said first cylinder and in which a second piston is reciprocatively disposed, said second piston being operatively connected with said first piston and sandwiched between first and second elastomeric members disposed in said second cylinder, said first and second elastomeric members serving to return said second piston to a neutral position when neither of said first and second variable volume chambers is pressurized.

7. A vehicle suspension as claimed in claim 1, wherein said second link is connected to said chassis and said road wheel through first and second elastomeric bushes respectively.

8. A vehicle suspension as claimed in claim 1, further comprising a third link operatively interconnecting said chassis and said road wheel, said third link extending from a location inboard of said road wheel toward said road wheel, said third link being connected to said chassis and said road wheel through third and fourth elastomeric bushes, respectively.

9. A vehicle suspension as claimed in claim 8, wherein said second and third links are essentially parallel.

10. A vehicle suspension as claimed in claim 1, further comprising a wheel support member to which said first and second links are pivotally connected through elastomeric members.

11. A vehicle suspension as claimed in claim 10, wherein said first link takes the form of a radius rod or trailing link.

12. A vehicle suspension as claimed in claim 1, wherein said first link takes the form of a trailing arm.

* * * * *